United States Patent [19]

Nishide et al.

[11] Patent Number: 4,923,553
[45] Date of Patent: May 8, 1990

[54] TIRE BUILDING APPARATUS

[75] Inventors: Seiichiro Nishide; Shigeoki Usami, both of Kodaira, Japan

[73] Assignee: Bridgestone Corporation, Tokyo, Japan

[21] Appl. No.: 252,203

[22] Filed: Oct. 3, 1988

[30] Foreign Application Priority Data

Oct. 6, 1987 [JP] Japan .................. 62-251964

[51] Int. Cl.$^5$ .............................. B29D 30/32
[52] U.S. Cl. .................. 156/401; 156/403; 156/417
[58] Field of Search ............ 156/401, 403, 414, 421.4, 156/417, 132, 398

[56] References Cited

U.S. PATENT DOCUMENTS

| | | | |
|---|---|---|---|
| 3,616,059 | 10/1971 | Frazier | 156/401 |
| 3,645,818 | 2/1972 | Frazier | 156/133 X |
| 3,687,779 | 8/1972 | Folden et al. | 156/401 |
| 4,128,450 | 12/1978 | Cantarutti | 156/417 |
| 4,302,274 | 11/1981 | Enders | 156/401 |
| 4,468,275 | 8/1984 | Enders | 156/403 X |
| 4,584,038 | 4/1986 | Enders | 156/401 X |
| 4,772,351 | 9/1988 | Thompson et al. | 156/417 |

FOREIGN PATENT DOCUMENTS

| | | | |
|---|---|---|---|
| 1158969 | 12/1983 | Canada | 156/403 |
| 44-20868 | 9/1969 | Japan . | |
| 60-15136 | 1/1985 | Japan . | |
| 58-7339 | 1/1986 | Japan . | |

Primary Examiner—Raymond Hoch
Attorney, Agent, or Firm—Sughrue, Mion, Zinn, Macpeak & Seas

[57] ABSTRACT

A tire building apparatus includes a forming drum to which tire constituting members are attached, annular bead setting rings movable in axial directions of the forming drum for grasping beads on their inner circumferential sides and driving the tire beads into predetermined positions on a tire constituting member, and annular turning-up holders movable in the axial directions of the forming drum for turning up parts of the tire constituting member on axially outer sides of bead driven positions about the tire beads with the aid of bladders. The bead setting rings and the turning-up holders are divided into a plurality of arcuate segments circumferentially spaced. The apparatus further comprises guiding units for supporting the arcuate segments radially movably, moving unit for moving the arcuate segments in radial directions in synchronism with each other into radial positions corresponding to a size of a tire to be formed and causing movements of the arcuate segments required for forming tires of various sizes, and regulating unit for regulating radially outward movements of the arcuate segments against reactions to which the arcuate segments are subjected from the bladders. The annular bead setting ring and the annular turning-up holder are integrally formed as a composite assembly having simultaneously functions of the guiding unit, moving unit and regulating unit.

10 Claims, 7 Drawing Sheets

FIG_5

FIG_6a

FIG_6b

FIG_6c

FIG_9

FIG_10

TIRE BUILDING APPARATUS

BACKGROUND OF THE INVENTION

This invention relates to a tire building apparatus capable of forming tires of various tires.

Hitherto used tire building apparatuses have been known, for example, as disclosed in Japanese Patent Application Publication No. 47-21,836. This disclosed tire building apparatus comprises a forming drum to which tire constituting members are attached. Annular bead rings are movable in axial directions of the forming drum for driving beads grasped on their inner circumferences into predetermined positions in the tire constituting members. Annular turning-up holders are movable in the axial directions of the forming drum for turning up parts of the tire constituting members on axially outer sides of the bead driving positions about the beads with the aid of bladders. Each of the annular bead rings is separable into a plurality of arcuate segments circumferentially separated and radially movable upon rocking. On the other hand, the annular turning-up holders are circumferentially continuous. In forming a tire by means of such a tire building apparatus, after a tire constituting member has been attached to the tire forming drum, the bead rings grasping beads on their inner circumferences are moved axially inwardly to drive the beads into predetermined positions in the tire constituting member. Thereafter, the bead rings are moved axially outwardly so as to expand the turning-up holders to retract the bead rings radially outwardly. Then, while the bladders are being expanded, the turning-up holders are moved axially inwardly so that parts of the tire constituting member on axially outer sides of the bead driven positions are turned up about the beads by means of the bladders.

With such a tire building apparatus of the prior art, the turning-up holders are circumferentially continuously annular and the bead rings are circumferentially divided into a plurality of parts and radially movable in order to avoid any interference of the bead rings with the bladders. Therefore, the tire building apparatus constructed as above described can form only tires of one size. In order to form tires of different sizes, the bead rings and the turning-up holders must be exchanged with others to meet sizes of the tires every time when the size is changed. Therefore, troublesome and time-consuming operations for the exchange of the members of the apparatus are required, which considerably lower the efficiency in the production line. Moreover, various kinds of bead rings and turning-up holders are needed, which unavoidably increase cost for manufacturing the apparatus. Further, as diameters of bead rings are previously fixed at certain values, irregularities in diameter of the bead rings directly result in inferior quality of tires produced such as an inconsistency of centers of the beads and bead rings.

SUMMARY OF THE INVENTION

It is a primary object of the invention to provide an improved tire building apparatus which eliminates all the disadvantages of the prior art above described and which is capable of manufacturing tires of various sizes by a simple operation.

It is another object of the invention to provide a tire building apparatus which is simple in construction, and inexpensive to manufacture and is capable of improving production efficiency and quality of tires.

In order to achieve these objects, in a tire building apparatus including a forming drum to which tire constituting members are attached, annular bead setting rings movable in axial directions of the forming drum for grasping beads on their inner circumferential sides and driving the beads into predetermined positions on a tire constituting member, and annular turning-up holders movable in the axial directions of the forming drum for turning up parts of the tire constituting member on axially outer sides of bead driven positions about said beads with the aid of bladders, according to the invention said bead setting rings and said turning-up holders are divided into a plurality of arcuate segments circumferentially spaced. The apparatus further comprises guiding means for supporting said arcuate segments radially movably, moving means for moving said arcuate segments in radial directions in synchronism with each other into radial positions corresponding to a size of a tire to be formed and causing movements of said arcuate segments required for forming tires of various sizes, and regulating means for regulating radially outward movements of the arcuate segments against reactions to which the arcuate segments are subjected from the bladders.

In a preferred embodiment of the invention, the annular bead ring and the annular turning-up holder are integrally formed.

In operation of the tire building apparatus according to the invention, first, a tire constituting member such as a carcass is attached to the circumference of the forming drum. After tire beads are supplied to the arcuate segments of the bead rings, the arcuate segments being guided by guiding means are moved radially outwardly by the moving means. As a result, the tire beads are grasped on their inner circumferences by all the arcuate segments and exactly made concentric to the bead setting rings. The bead rings grasping the beads are then moved axially inwardly to transfer the beads to predetermined positions on the tire constituting member, where the beads are driven to the tire constituting member. After the bead setting rings are moved axially outwardly, the arcuate segments of the turning-up holders being guided by the guiding means are moved in radial directions by moving means to set the turning-up holders in positions corresponding to a set diameter of tires to be manufactured and bladders are expanded. The arcuate segments are then moved axially inwardly to turn up parts of the tire constituting member axially outward of the bead driven positions about the beads by means of the bladders. In this case, the arcuate segments are subjected to reactions directing radially outwardly from the bladders so that the arcuate segments tend to move radially outwardly. However, the regulating means support the reactions to regulate the radial outward movements of the arcuate segments. As a result, turning up the tire constituting member is exactly effected and movements of the arcuate segments to positions corresponding to different sizes of tires are also prevented. Thereafter, the arcuate segments are moved axially outwardly.

In case that the size of tires to be manufactured is to be changed, the arcuate segments are moved in radial directions in synchronism with each other by moving means into radial positions corresponding to a size of tires to be formed. The tires of the new size are then formed in the same manner as above described. According to the invention, tires of different sizes can be formed by one tire building apparatus only moving the arcuate segments in the radial directions, thereby improving the production efficiency for manufacturing tires to reduce the manufacturing cost of the tires.

In the second aspect of the invention, as the bead rings and the turning-up holders are integrally formed, they have simultaneously functions of the guiding means, moving means and regulating means. Therefore, the tire building apparatus according to the invention is simple in construction and inexpensive to manufacture. As the radial positions of these arcuate segments are able to be simultaneously changed, the labor efficiency is also improved.

The invention will be more fully understood by referring to the following detailed specification and claims taken in connection with the appended drawings.

DESCRIPTION OF THE PREFERRED EMBODIMENT

Figure 1:
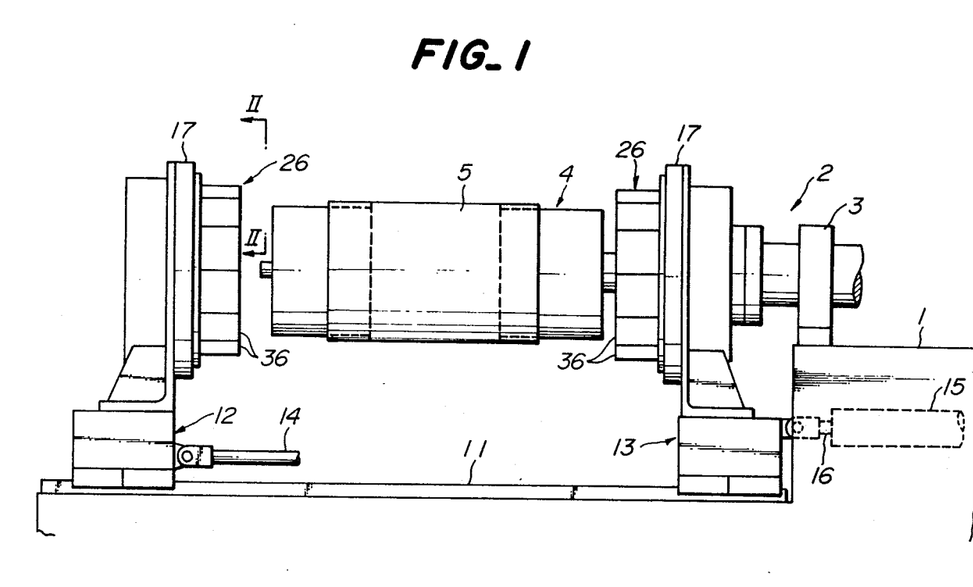
FIG. 1 is a schematic front elevation illustrating one embodiment of the tire building apparatus according to the invention.

Referring to FIG. 1, a tire building apparatus comprises a base 1 rotatably supporting through a support frame 3 a forming drum 4 whose diameter is expansible and contractible. A tire constituting member 5, for example, a carcass ply is attached to a circumference of the forming drum 4. The forming drum 4 comprises at its axial ends bladders 6 which, when expanded, serve to turn up or fold the tire constituting member 5 (FIG. 6b).

On the base 1 and below the forming drum 4 there are provided rails 11 in parallel with an axis of the forming drum 4, on which slide frames 12 and 13 are slidably supported at both axial ends of the forming drum 4. To the slide frame 12 is connected an end of a piston rod 14 of a cylinder (not shown), while to the slide frame 13 is connected an end of a piston rod 16 of a cylinder 15. As a result, when the piston rods 14 and 16 of the cylinders are extended or retracted, the slide frames 12 and 13 are moved in axial directions of the forming drum 4.

Figure 2:
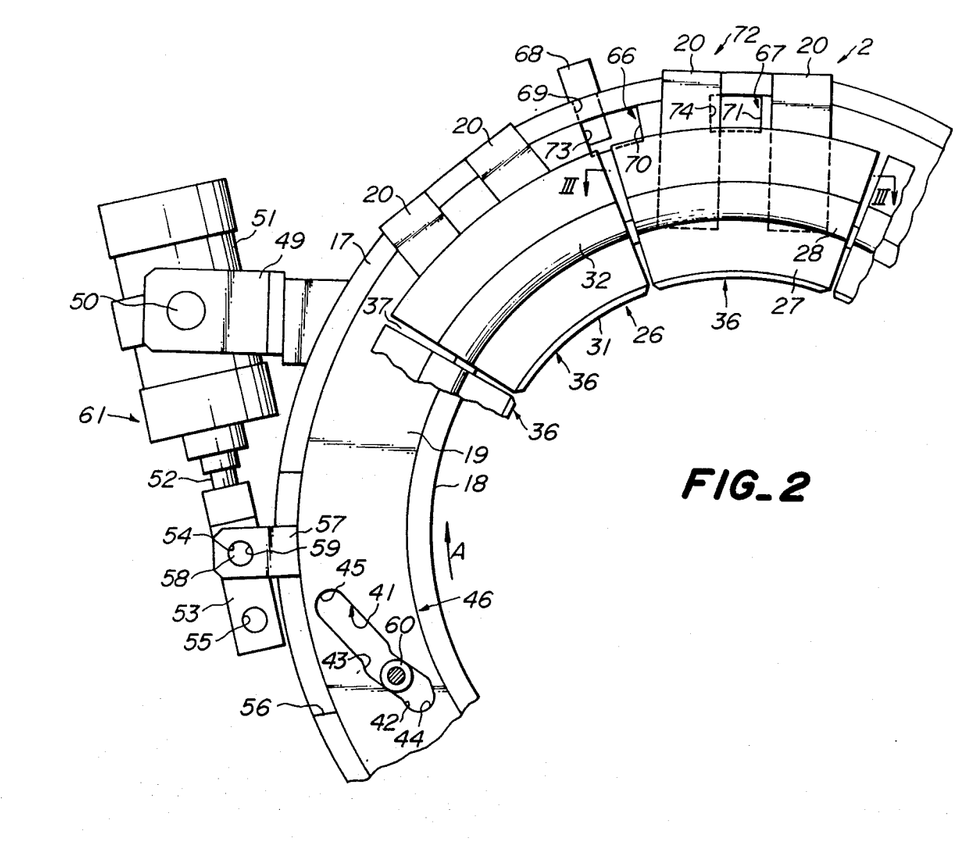
FIG. 2 is a partial front elevation viewed in directions of arrows II in FIG. 1.
Figure 3:
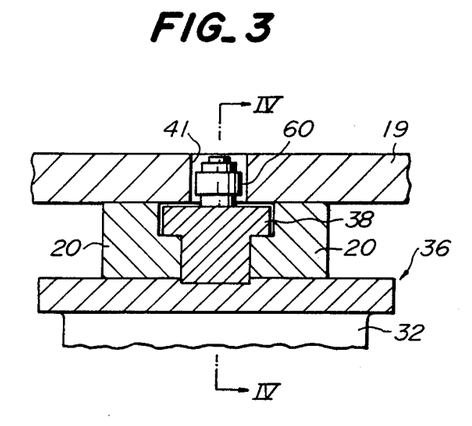
FIG. 3 is a sectional view taken along a line III—III in FIG. 2.
Figure 4:
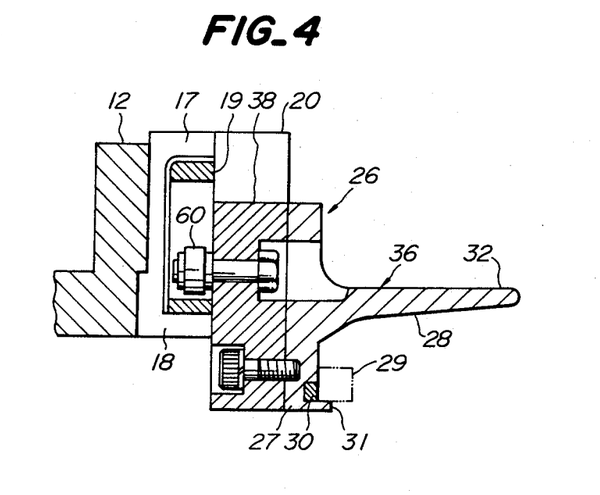
FIG. 4 is a sectional view taken along a line IV—IV in FIG. 3.

Onto inner surfaces of the slide frames 12 and 13 in opposition to each other are secured outer rings 17 and inner rings 18 concentrically arranged, respectively as shown in FIGS. 2, 3, and 4. The apparatus comprises substantially the same assemblies on both sides of the forming drum 4. FIGS. 2-10 illustrate the members on the one side of the forming drum. A cam ring 19 is rotatably interposed between the outer and inner rings 17 and 18. To the outer and inner rings 17 and 18 are mounted guide means which comprises a plurality of pairs, each pair consisting of two guides 20. Each pair of the guides 20 extend radially and are circumferentially equally spaced.

A bead setting ring 27 and a turning-up holder 28, are integrally made to form an annular composite unit 26 (FIG. 4). As a result, the composite unit 26 has a function as a bead ring for grasping a tire bead 29 on its inner circumference to drive the tire bead 29 into position in the tire constituting member 5 and a further function as a turning-up holder for turning up or folding part of the tire constituting member 5 on the axially outer side of the bead driven position about the tire bead 29 with the aid of a bladder 6. By integrally forming the bead setting ring 27 and the turning-up holder 28 in this manner, they can have simultaneously the functions of the guiding means, moving means and regulating means later described so that the apparatus will be simple in construction and inexpensive, and radial positions of arcuate segments later described can be simultaneously changed to improve the efficiency of the operation.

In order to accomplish the two functions above described, the composite unit 26 comprises magnets 30 for attracting the tire bead 29, small projections 31 on a radial inner end of the unit 26 for engaging an inner circumference of the tire bead 29, and large projections 32 at substantial central portions in radial directions. Moreover, the composite unit 26 is divided into a plurality of arcuate segments 36 circumferentially equally spaced and having the number of the segments 36 equal to the number of pairs of guides. There are slight clearances between these arcuate segments 36.

Figure 5:
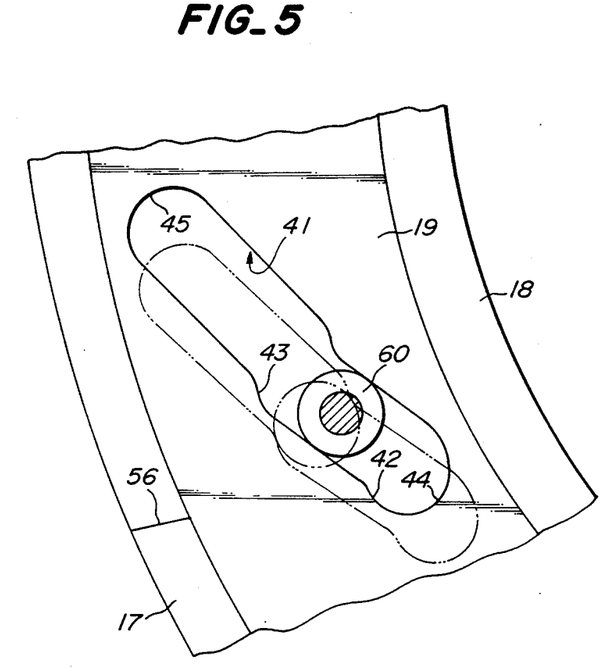
FIG. 5 is a side view of the proximity of the cam groove of the apparatus shown in FIG. 1.

Guide blocks 38 are secured to the respective arcuate segments 36 and embraced on both sides by the guides 20 so that the arcuate segments 36 are radially movably supported by the guides 20. The cam ring 19 is formed with cam grooves 41 whose number is equal to the number of the arcuate segments 36. These cam grooves 41 are arranged opposing to the arcuate segments 36. Each of the cam grooves 41 is inclined in one direction with respect to radial directions, that is, inclined toward the direction shown by an arrow A (FIG. 2). Each of the cam grooves 41 includes flat portions 42 and 43 extending substantially in the tangential direction A or circumferential directions of the cam ring 19 at a radially inner end and a radially center portion (FIG. 5). The flat portions 42 and 43 and a radially outer end wall 45 form regulating means 46 which regulates radially outward movements of the arcuate segments 36 against reactions to which the arcuate segments 36 are subjected from the bladder 6 when the tire constituting member 5 is turned up or folded.

To a bracket 49 fixed to the outer ring 17 is secured by a pin 50 a cylinder 51 whose piston rod 52 has at free end a connecting plate 53 fixed thereto. The connecting plate 53 is formed with two connecting apertures 54 and 55 spaced in longitudinal directions of the piston rod 52. On the other hand, to the cam ring 19 is mounted a bracket 57 extending through a slit 56 formed in the outer ring 17. In this embodiment, in case that a pin 58 is inserted into the connecting aperture 54 and an aperture 59 of the bracket 57, the apparatus can be used for forming tires of small sizes (for example, 13 inch rim diameters) and middle sizes (for example, 14 inch rim diameters). In case that the pin 58 is inserted into the connecting aperture 55 and the aperture 59 of the bracket 57, the apparatus can be used for forming tires of middle sizes (for example, 14 inch rim diameters) and large sizes (for example, 15 inch rim diameters). Moreover, each of the guide blocks 38 rotatably supports a cam follower 60 inserted in the cam groove 41. As a result, when the cylinder 51 is actuated to rotate the cam ring 19, the arcuate segments 36 are moved in radial directions in synchronism with the rotation of the cam ring 19 by a cam action of the cam grooves 41. Therefore, movements of the arcuate segments 36 are effected within ranges in which the segments 36 are to move in forming tires of one size, and movements of the arcuate segments 36 to radial positions corresponding to a new size of tires for next manufacturing are effected in this manner. The cam ring 19, the cam grooves 41, the cylinder 51, the connecting plate 53 and the cam follower 60 form moving means 61.

The cam ring 19 is formed in an outer circumference with two regulating grooves 66 and 67 circumferentially spaced and having side walls 70 and 73 and 71 and 74. The outer ring 17 is formed with a through-aperture 69 through which a regulating pin 68 is inserted. When the regulating pin 68 is inserted in the through-aperture 69 and the regulating groove 66 or the through-aperture 69 and the regulating groove 67, upon retracting the piston rod 52 of the cylinder 51 to a great extent, the regulating pin 68 abuts against the side wall 73 of the regulating groove 66 or the side wall 74 of the regulating groove 67 to limit the radial inward movements of the arcuate segments 36. This is because of the prevention of further rotation of the cam ring 19 so that radially innermost positions of the arcuate segments 36 (corresponding to the minimum diameter) are regulated and the arcuate segments 36 are prevented from moving to positions corresponding to smaller sizes of tires. The regulating grooves 66 and 67, the regulating pin 68, and the through-aperture 69 form defining means 72 as a whole for defining the radially innermost positions (corresponding to the minimum diameter) of the arcuate segments 36.

The operation of the apparatus in this embodiment will be explained hereinafter.

It is now assumed that a tire constituting member 5 is attached to the circumference of the forming drum 4, and the slide frames 12 and 13 are stationary spaced from the forming drum 4 at both axial ends of the drum 4. As the pin 58 is inserted in the connecting aperture 54 and the aperture 59, and the regulating pin 68 is inserted in the through-aperture 69 and the regulating groove 66, the tire building apparatus is ready for forming tires of middle sizes. In this case, moreover, since the regulating pin 68 abuts against the side wall 73 of the regulating groove 66, the arcuate segments 36 assume the radially innermost positions (corresponding to the minimum diameter) in the middle size of tires.

Figure 6A:
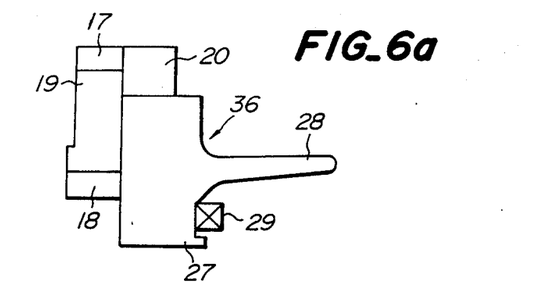
FIGS. 6a, 6b and 6c are schematic views for explaining the operations of the apparatus shown in FIG. 1.
Figure 6B:
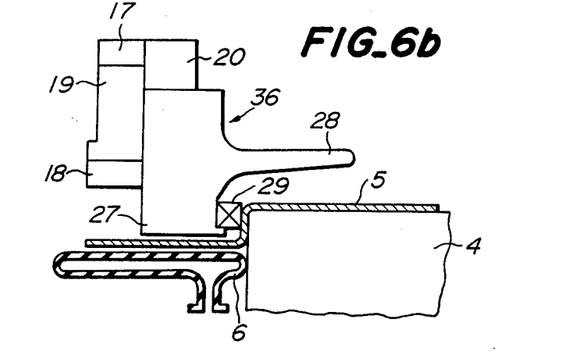

Beads 29 are then supplied to the bead setting rings 27 as shown in FIG. 6a so as to be attracted by the magnets 30. The cylinder 51 is then actuated so as to extend the piston rod 52. As a result, the cam ring 19 is rotated in a direction opposite to the direction A in FIG. 2. The cam followers 60 tend to move along the cam grooves 41, respectively, by the rotation of the cam ring 19. However, the arcuate segments 36 are only permitted to move in radial directions by the restricting action of the guides 20 so that the cam followers move radially outwardly without circumferentially moving. As a result, all the arcuate segments 36 move radially outwardly in synchronism with each other so that the small projections 31 of all the arcuate segments 36 engage the inner circumference of the beads 29 as shown in FIG. 4. The tire beads 29 are exactly centered by the bead setting rings 27 and grasped on the inner circumferences by the bead setting rings 27.

The piston rod 14 of the cylinder (not shown) is retracted, while the piston rod 16 of the cylinder 15 is extended to move the slide frames 12 and 13 toward each other. As a result, the beads 29 are transferred to predetermined positions on the tire constituting member 5 as shown in FIG. 6b. The piston rod 52 of the cylinder 51 is then retracted to transfer the beads 29 from the bead rings 27 to the forming drum 4. Thereafter, the piston rod 14 is extended and the piston rod 16 is retracted to move the slide frames 12 and 19 away from each other.

The bladders 6 are supplied with pressurized air so as to expand. Thereafter, the piston rod 52 of the cylinder 51 is again extended to rotate the cam ring 19 in the other direction until the side wall 70 of the regulating groove 66 abuts against the regulating pin 68. At this instant, the cam grooves 41 and the cam followers 60 move to positions shown in phantom lines in FIG. 5. This rotation of the cam ring 19 causes the arcuate segments 36 to move to the radially outermost positions (corresponding to the maximum diameter) in the middle size of the tire.

Figure 6C:
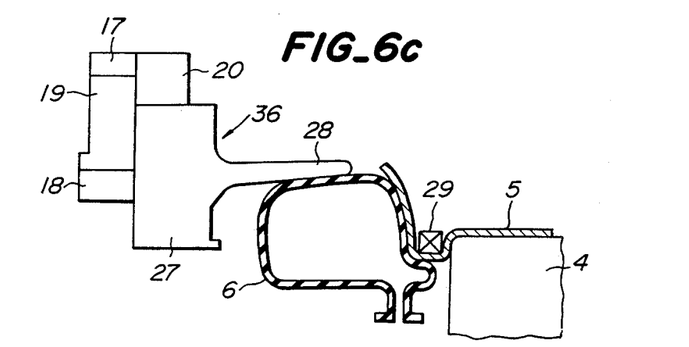

Thereafter, the piston rod 14 is retracted and the piston rod 16 is extended to move the slide frames 12 and 13 toward each other. As a result, each of the turning-up holder 28 urges the expanded bladder 6 toward the forming drum 4 so that the part of the tire constituting member 5 on the axially outer side of the bead driven position is turned up or folded about the bead 29 as shown in FIG. 6c. In this case, the arcuate segments 36 are subjected to reactions from the bladder 6 directing radially outwardly. At this moment, the cam followers 60 engage the flat portions 43 substantially extending in tangential directions as shown in phantom lines in FIG. 5, so that the cam ring 19 is not rotated by the reactions above described, thereby preventing the radial outward movement of the arcuate segments 36. The turning up the tire constituting member 5 is thus accomplished in a reliable manner. The slide frames 12 and 13 are then moved away from each other, and the piston rod 52 is retracted so that the arcuate segments 36 are returned to the radially innermost positions in the middle size of tires. Thereafter, while the forming drum is being rotated, other tire constituting members are attached one by one on the tire constituting member 5 to form a green tire.

In changing the tire size from the middle to the small, after the regulating pin 68 is removed from the through-aperture 69, the piston rod 52 of the cylinder 51 is retracted to rotate the cam ring 19 in the direction A until the cam flowers 60 abut against a radially inner end walls 44. As a result, the arcuate segments 36 move radially inwardly to bring the apparatus to be ready for forming the small size of tires.

Figure 7:
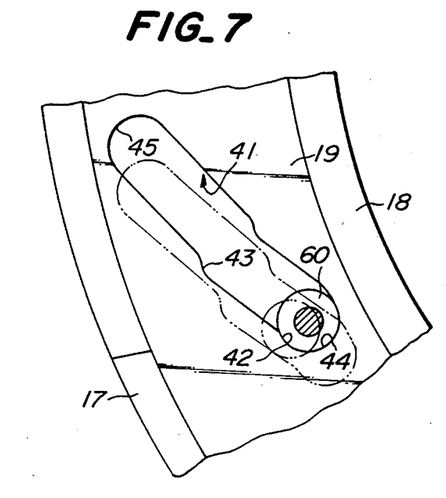
FIG. 7 is an explanatory view illustrating a position of a cam follower used in the apparatus when forming a tire of small size.
Figure 8:
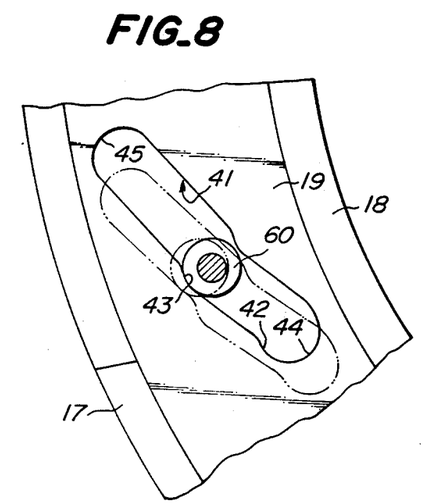
FIG. 8 is an explanatory view similar to FIG. 7 but illustrating when forming a tire of middle size.
Figure 9:
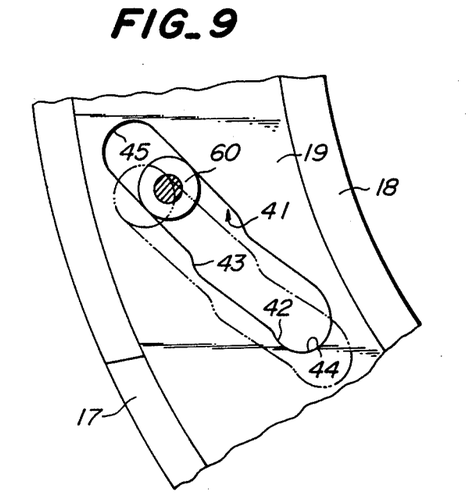
FIG. 9 is an explanatory view also similar to FIG. 7 but illustrating when forming a tire of large size.

The tire forming operation under these circumstances will be briefly explained. First, a tire bead 29 is supplied to the bead setting ring 27 on each of the slide frames 12 and 13 when the cam followers 60 abut against the radially inner end walls 44 of the cam grooves 41. Then, the piston rod 52 of the cylinder 51 is extended to move the arcuate segments 36 radially outwardly so that the beads 29 are centered and grasped from their inner circumferences. At this moment, the cam grooves 41 and the cam followers have been moved to the positions shown in phantom liens as shown in FIG. 7. The slide frames 12 and 13 are then axially reciprocatively moved and the grasped beads 29 are driven into predetermined positions on the tire constituting member 5. Thereafter, the piston rod 52 of the cylinder 51 is retracted so that the cam followers 60 abut against the radially inner end walls 44 of the cam grooves 41.

After the bladders 6 have been expanded, the slide frames 12 and 13 are moved toward each other so that the turning-up holders 28 urge the bladders 6 axially inwardly to turn up parts of the tire constituting member 5 on axially outer side of the bead driven positions about the beads 29. In this case, the arcuate segments 36 are subjected to reactions directing radially outwardly from the bladders 6. However, as the cam followers abut against the flat portions 42 extending substantially in tangential directions, the cam rings 19 are not rotated by the reactions, thereby regulating the radially outward movements of the arcuate segment 36. In this manner, according to the invention tires of different sizes can be formed only by moving the arcuate segments 36 radially, thereby improving the producing efficiency. Moreover, tires of plural sizes can be produced only by one tire building apparatus and cost for manufacturing tires can be considerably reduced.

After the pin 58 has been removed from the connecting aperture 54 and the aperture 59, the cam ring 19 is rotated in the opposite direction. The pin 58 is inserted into the connecting aperture 55 and the aperture 59 to bring the apparatus ready for forming tires of the middle or large size. When it is required to form tires of the middle size, the regulating pin 68 is removed from the through-aperture 69. In this case, when the piston rod 52 of the cylinder 51 is at the retracted stroke end, the cam followers 60 engage the flat portions 43 of the cam grooves 41 shown in solid lines in FIG. 8.

The operation for forming a tire of the middle size will be briefly explained. Under the condition of the cam grooves 41 and the cam followers 60 shown in FIG. 8, tire beads 29 are supplied to the bead setting rings 27. The piston rod 52 of the cylinder 51 is then extended to move the arcuate segments 36 radially outwardly so that while the beads 29 are centered and grasped on inner circumferences. As a result, the cam grooves 41 and the cam followers 60 are moved to the positions, for example, shown in phantom lines in FIG. 8. then, the slide frames 12 and 13 are reciprocatively moved in the axial directions to drive the grasped beads 29 into predetermined positions in the tire constituting member 5.

The piston rod 52 of the cylinder 51 is then retracted to the stroke end. After the bladders 6 are then expanded, the slide frames 12 and 13 are moved toward each other, so that the turning-up holders 28 urge the bladders 6 axially inwardly to turn up parts of the tire constituting member axially outward of the bead driven positions about the tire beads 29. In this case, the arcuate segments 36 are subjected to reactions directing radially outwardly from the bladder 6. However, as the cam followers 60 engage the flat portions 43 substantially extending in the tangential directions, the cam rings 19 are not rotated by the reactions, thereby regulating the radially outward movement of the arcuate segments 36.

In case that the size of the tire to be formed is changed from the middle to the large size, the piston rod 52 of the cylinder 51 is extended to rotate the cam ring 19 in the opposite direction to bring the through-aperture 69 into alignment with the regulating groove 67. The regulating pin 68 is then inserted into the through-aperture 69 and the regulating groove 67, so that the radially innermost positions of the arcuate segments 36 are regulated. According to the operation above described, the arcuate segments 36 are moved radially outwardly to bring the apparatus to be ready for manufacturing tires of the large size.

The operations for forming a tire under this condition will be briefly explained. First, the piston rod 52 of the cylinder 51 is retracted to rotate the cam ring 19 in the direction A so that the regulating pin 68 abuts against the side wall 74 of the regulating groove 67. As a result, the cam grooves 41 and the cam followers 60 are in a relation shown in solid lines in FIG. 9. After the arcuate segments 36 are moved by rotation of the cam ring 19 to the radially innermost positions in the large size of tires, tire beads 29 are supplied to the bead rings 27. Thereafter, the piston rod 52 of the cylinder 51 is extended to move the arcuate segments 36 radially outwardly, so that the beads 29 are centered and grasped on inner circumferences.

The slide frames 12 and 13 are then axially reciprocatively moved to drive the grasped beads 29 into predetermined positions in the tire constituting member 5. Thereafter, the piston rod 52 of the cylinder 51 is extended so that the cam followers 60 abut against radially outer end walls 45 of the cam grooves 41 with the result that the arcuate segments 36 are moved to the radially outermost positions (corresponding to the maximum diameter) in the large size of the tires.

After the bladders 6 are expanded, the slide frames 12 and 13 are moved toward each other so that the turning-up holders 28 urge the bladders 6 axially inwardly to turn up parts of the tire constituting member 5 on axially outer sides of the bead driven positions about the beads. In this case, the arcuate segments are subjected to reactions directing radially outwardly from the bladders 6. However, as the cam followers 60 abut against the radially outer end walls 45 of the cam grooves 41, the cam ring 19 is not rotated by the reactions, thereby preventing the radial movements of the arcuate segments 36.

Figure 10:
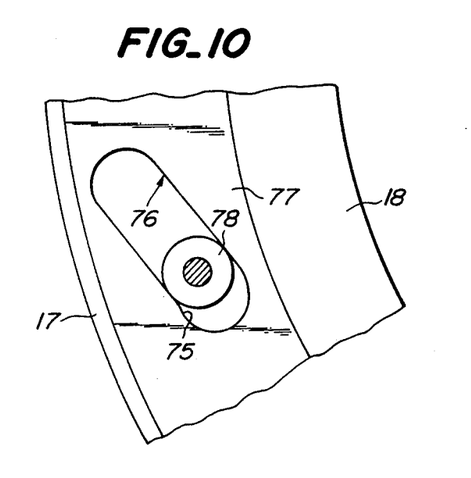
FIG. 10 is a side view illustrating a contour of a cam groove when forming tires of two different sizes.

In the above embodiment, the tire building apparatus has been explained capable of forming tires of three sizes. The apparatus may be so constructed as to form tires of two sizes by forming cam grooves 76 having flat portions 75 only at radially inner ends in the cam ring 77. The operation of the apparatus capable of forming tires of two sizes is substantially same as that in the apparatus in the above embodiment when forming tires of the middle and large sizes with exception that cam followers 78 abut against the radially inner walls of the cam grooves 76 in order to regulate the radially innermost positions of the arcuate segments.

Moreover, the apparatus may be constructed to form tires more than four sizes according to the invention. Furthermore, although the bead ring has been explained integrally formed with the turning-up holder 28 in the above embodiment, the bead ring and the turning-up holder may be formed by separate members and constructed by pluralities of arcuate segments, respectively. A pneumatic motor or electric motor may be used instead of the cylinder 51 in order to rotate the cam ring 19. The radial movements of the arcuate segments 36 have been explained carried out by the cam grooves 41 and the cam followers 60 in the above embodiment. Instead of such cam elements, a rack and a pinion may be used and the pinion may be driven by a chain, timing-belt and gear in synchronism with movements of the other cam ring.

As can be seen from the above explanation, according to the invention only the arcuate segments are moved in radial directions to make it possible to form tires of different sizes associated with more than two rim diameters so that production efficiency is improved and uniformity in quality of tires is also improved. Only one tire building apparatus can produce tires of plural sizes to reduce cost for manufacturing tires. In the second aspect of the invention, as the bead rings and the turning-up holders are integrally formed, they have simultaneously functions of the guiding means, moving means and regulating means. Therefore, the tire building apparatus according to the invention is simple in construction and inexpensive to manufacture. Since the radial positions of these arcuate segments are able to be simultaneously changed, the operation efficiency is also improved.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A tire building apparatus comprising; a forming drum to which tire constituting members are attached, annular bead setting rings movable in axial directions of the forming drum for grasping tire beads on their inner circumferential sides and driving the tire beads into predetermined positions on a tire constituting member, and annular turning-up holders movable in the axial directions of the forming drum for turning up parts of the tire constituting member on axially outer sides of bead driven positions about said tire beads with the aid of bladders, wherein said annular bead setting rings and said turning-up holders are divided into a plurality of arcuate segments circumferentially spaced, guiding means for supporting said arcuate segments radially movably, moving means for moving said arcuate segments in radial directions in synchronism with each other into radial positions corresponding to a size of a tire to be formed and for causing movements of said arcuate segments required for forming tires of various sizes, and regulating means for regulating radially outward movements of the arcuate segments against reactions to which the arcuate segments are subjected from the bladders.

2. A tire building apparatus as set forth in claim 1, wherein the annular bead setting ring and the annular turning-up holder are integrally formed to form an annular composite unit.

3. A tire building apparatus as set forth in claim 1, wherein each of said arcuate segments is provided with at least one magnet for attracting the bead, at least one small projection on a radial inner end of the annular bead setting ring for engaging an inner circumference of the bead and at least one large projection.

4. A tire building apparatus as set forth in claim 1, wherein an inner ring and an outer ring are concentrically provided for supporting said guide means and a cam ring is rotatably provided concentric to and between the inner and outer rings so that when the cam ring is rotated relative to the inner and outer rings in both directions, said arcuate segments are simultaneously moved radially inwardly and outwardly, whereby forming said moving means.

5. A tire building apparatus as set forth in claim 4, wherein said cam ring is formed with cam grooves inclined to radial directions of the cam ring and in opposition to the arcuate segments, respectively, and the arcuate segments are provided with cam followers fitted in the cam grooves, respectively, whereby when the cam ring is rotated, the arcuate segments are moved in the radial directions by action of said cam grooves and said cam followers.

6. A tire building apparatus as set forth in claim 4, wherein a piston and cylinder assembly is provided whose piston is pivotally mounted onto said outer ring and whose piston rod is pivotally connected to the cam ring so that when the piston rod is extended and retracted, the cam ring is rotated relative to the inner and outer rings.

7. A tire building apparatus as set forth in claim 6, wherein said piston rod is selectively pivotally connected to the cam ring at different positions along an axis of the piston rod.

8. A tire building apparatus as set forth in claim 5, wherein each of said cam grooves is formed along a side wall with flat portions extending substantially circumferential directions of the cam ring at a radially inner end and a radially center portion of the cam groove to form said regulating means in conjunction with a radially outer end wall of the cam groove.

9. A tire building apparatus as set forth in claim 5, wherein each of said cam grooves is formed with a flat portion extending substantially circumferential directions of the cam ring at a radially inner end of the cam groove to form said regulating means in conjunction with a radially outer end wall of the cam groove.

10. A tire building apparatus as set forth in claim 4, wherein said outer ring is formed with a plurality of through-apertures and said cam ring is formed with a plurality of regulating apertures corresponding to the through-apertures, whereby when a regulating pin is inserted in any one of the through-apertures, one side wall of one of the regulating apertures of the cam ring abuts against the regulating pin, thereby defining a radially innermost position of the arcuate segments.

* * * * *